(12) United States Patent
Baxter et al.

(10) Patent No.: US 10,551,120 B2
(45) Date of Patent: Feb. 4, 2020

(54) METHOD FOR CONDENSING A CO2 VAPOR STREAM BEYOND THE FROST POINT

(71) Applicants: Larry Baxter, Orem, UT (US); Nathan Davis, Bountiful, UT (US)

(72) Inventors: Larry Baxter, Orem, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 281 days.

(21) Appl. No.: 15/425,412

(22) Filed: Feb. 6, 2017

(65) Prior Publication Data

US 2018/0224205 A1    Aug. 9, 2018

(51) Int. Cl.
*F25J 3/06*    (2006.01)
*B01D 5/00*    (2006.01)
*B01D 8/00*    (2006.01)
*B01L 5/00*    (2006.01)

(52) U.S. Cl.
CPC .............. *F25J 3/067* (2013.01); *B01D 5/006* (2013.01); *B01D 5/009* (2013.01); *B01D 5/0012* (2013.01); *B01D 5/0054* (2013.01); *B01D 5/0069* (2013.01); *B01D 5/0093* (2013.01); *B01D 8/00* (2013.01); *B01L 5/00* (2013.01); *F25J 3/061* (2013.01); *F25J 3/0615* (2013.01); *F25J 3/0635* (2013.01); *F25J 3/0695* (2013.01); *F25J 2205/20* (2013.01); *F25J 2205/84* (2013.01); *F25J 2205/90* (2013.01); *F25J 2215/04* (2013.01); *F25J 2235/60* (2013.01); *F25J 2240/02* (2013.01); *F25J 2240/40* (2013.01); *F25J 2270/12* (2013.01); *F25J 2270/904* (2013.01); *F25J 2290/44* (2013.01); *Y02C 10/12* (2013.01)

(58) Field of Classification Search
CPC .......... F25J 3/061; F25J 3/0615; F25J 3/0635; F25J 2205/20; F25J 2205/90; F25J 2215/04; F25J 2220/66; F25J 2235/60; F25J 2270/12; F25J 3/067; B01D 5/0075
See application file for complete search history.

(56) References Cited

U.S. PATENT DOCUMENTS

2012/0153514 A1*  6/2012  Baxter .................... B01D 7/02
                                                              261/128

* cited by examiner

*Primary Examiner* — Elizabeth J Martin

(57) ABSTRACT

A method for cryogenic cooling without fouling is disclosed. The method comprises providing a first cryogenic liquid saturated with a dissolved gas; expanding the first cryogenic liquid into a separation vessel, separating into a vapor, a second cryogenic liquid, and a first solid; drawing the vapor into a heat exchanger and the second cryogenic liquid and the first solid out of the separation vessel; cooling the vapor against a coolant through the heat exchanger, causing the vapor to form a third cryogenic liquid and a second solid, the second solid dissolving in the third cryogenic liquid; and combining the second cryogenic liquid and the first solid with the third cryogenic liquid, producing a final cooled slurry. In this manner, the cryogenic cooling is accomplished without fouling.

20 Claims, 5 Drawing Sheets

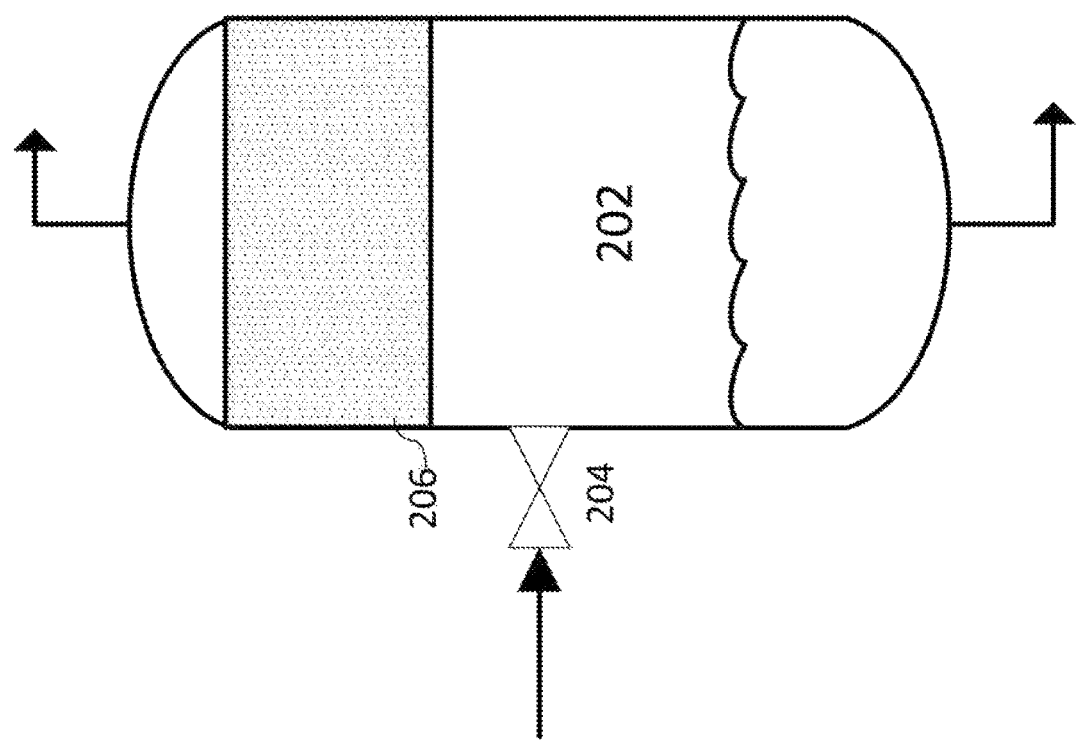

METHOD FOR CONDENSING A CO2 VAPOR STREAM BEYOND THE FROST POINT

This invention was made with government support under DE-FE0028697 awarded by The Department of Energy. The government has certain rights in the invention.

BACKGROUND

Field of the Invention

This invention relates generally to the field of operation of cryogenic heat exchangers. Our immediate interest is in the ability to cool a cryogenic liquid without fouling the heat exchanger.

Related Technology

Heat exchange is a fundamental unit operation in nearly all chemical processes, from simple in-home heaters to extraordinarily complex industrial furnaces. The art of cryogenic heat exchange is a less mature branch of industrial heat exchange. Cryogenic heat exchange adds a new problem to heat exchange. Whereas traditional heat exchangers are typically blocked by scale formation or deposition of entrained solids, cryogenic heat exchangers can also be blocked by constituents in the process fluid condensing out of the process fluid and depositing onto the walls of the heat exchanger. These deposits can not only exacerbate deposition of entrained solids, but can block the heat exchanger independently.

Prevention of deposition is a very important task. Whole industries exist to prevent scale by chemical addition to systems. However, these chemicals can be costly and be detrimental to the environment. Addition of chemicals is also counter-productive when purification of liquids is the purpose of heat exchange. Cryogenics, being a relatively young industry, requires better methods for preventing fouling of heat exchangers to allow for steady operations.

United States patent publication number 5167838 to Wilensky teaches a three phase separation process. This disclosure is pertinent and may benefit from the methods disclosed herein and is hereby incorporated for reference in its entirety for all that it teaches.

U.S. Pat. No. 6,053,007 to Victory teaches a process for separating a multi-component gas stream containing at least one freezable component. This disclosure is pertinent and may benefit from the methods disclosed herein and is hereby incorporated for reference in its entirety for all that it teaches.

United States patent publication number 2012/0031144 to Northrop teaches a system for the removal of acid gases from a feed gas stream utilizing a cryogenic distillation tower. This disclosure is pertinent and may benefit from the methods disclosed herein and is hereby incorporated for reference in its entirety for all that it teaches.

United States patent publication number 2012/0079852 to Northop teaches a method for the removal of heavy hydrocarbons and acid gases from a hydrocarbon gas stream. This disclosure is pertinent and may benefit from the methods disclosed herein and is hereby incorporated for reference in its entirety for all that it teaches.

United States patent publication number 2012/8146661 to Bravo teaches a system and method for cryogenic treatment of gas. This disclosure is pertinent and may benefit from the methods disclosed herein and is hereby incorporated for reference in its entirety for all that it teaches.

United States patent publication number 2009/7493779 to Amin teaches a method for removing solid carbon dioxide. This disclosure is pertinent and may benefit from the methods disclosed herein and is hereby incorporated for reference in its entirety for all that it teaches.

SUMMARY

A method for cryogenic cooling without fouling is disclosed. The method comprises the following steps. First, provide a first cryogenic liquid, wherein the first cryogenic liquid is saturated with a dissolved gas. Second, expand the first cryogenic liquid into a separation vessel through an expansion inlet. The first cryogenic liquid separates into a vapor, a second cryogenic liquid, and a first solid. The first solid consists of a frozen form of the dissolved gas. The first solid is entrained in the second cryogenic liquid. The vapor is saturated with at least a portion of the dissolved gas. Third, use a pump to draw the vapor into a heat exchanger and to draw the second cryogenic liquid and the first solid out of the separation vessel. Fourth, cool the vapor against a coolant through the heat exchanger, causing the vapor to form a third cryogenic liquid and a second solid. The second solid has a greater solubility in the third cryogenic liquid than in the vapor. The third cryogenic liquid removes and dissolves any of the second solid that forms on the heat exchanger as the vapor condenses. Fifth, combine the second cryogenic liquid and the first solid with the third cryogenic liquid, producing a final cooled slurry. In this manner, the cryogenic cooling is accomplished without fouling.

The heat exchanger may be a single-pass heat exchanger oriented vertically with the vapor entering at a top inlet and the third cryogenic liquid washing down any of the second carbon dioxide solid that forms on the heat exchanger.

The first cryogenic liquid may be any compound or mixture of compounds with a freezing point below a temperature at which the first solid forms. The dissolved gas may be nitrogen oxide, sulfur dioxide, nitrogen dioxide, sulfur trioxide, hydrogen sulfide, hydrogen cyanide, water, hydrocarbons with a freezing point above 0 C, or combinations thereof.

The separation vessel may contain a demister in the top one third of the separation vessel and the first cryogenic liquid may enter the separation vessel no higher than halfway up the separation vessel. The demister may be a wire mesh or packing material. The expansion inlet may be a valve, turbine, or orifice plate. The heat exchanger may be a shell and tube, plate, plate and frame, plate and shell, spiral, and plate fin exchangers.

Any surface of the separation vessel exposed to the first cryogenic liquid, the second cryogenic liquid, or the third cryogenic liquid may be aluminum, stainless steel, polymers, ceramics, polytetrafluoroethylene, polychlorotrifluoroethylene, natural diamond, man-made diamond, chemical-vapor deposition diamond, polycrystalline diamond, or combinations thereof. Any surface of the heat exchanger exposed to the vapor may be aluminum, stainless steel, polymers, ceramics, polytetrafluoroethylene, polychlorotrifluoroethylene, natural diamond, man-made diamond, chemical-vapor deposition diamond, polycrystalline diamond, or combinations thereof. Any surface of the heat exchanger exposed to the vapor may be polished smooth. The separation vessel and the expansion inlet may be sized to cause the vapor produced to consist of between 20 and 99 mol % of the first cryogenic liquid.

The pump may be a centrifugal, piston, pressure-recovery, propeller, circulator, slurry, positive-displacement, diaphragm, progressive-cavity, screw, or vane pump. Any surface of the pump exposed to the final cooled slurry may be stainless steel, ceramics, cast aluminum, wrought aluminum, bronze, graphite resin, or combinations thereof.

The coolant may be liquid nitrogen, ethane, methane, propane, refrigerants, and combinations thereof.

The second cryogenic liquid and the first solid may be combined through a mixing chamber before the pump with the third cryogenic liquid. A solids removal process may be placed after the mixing chamber. In another embodiment, the second cryogenic liquid and the first solid may be passed through a solids removal process before the pump, whereby the first solid is removed.

The solids removal process may be filtration, settling, centrifugation, electrostatic precipitation, agglomeration, froth floatation, crystallization, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2 shows one embodiment of the separation vessel of the present invention.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1A:
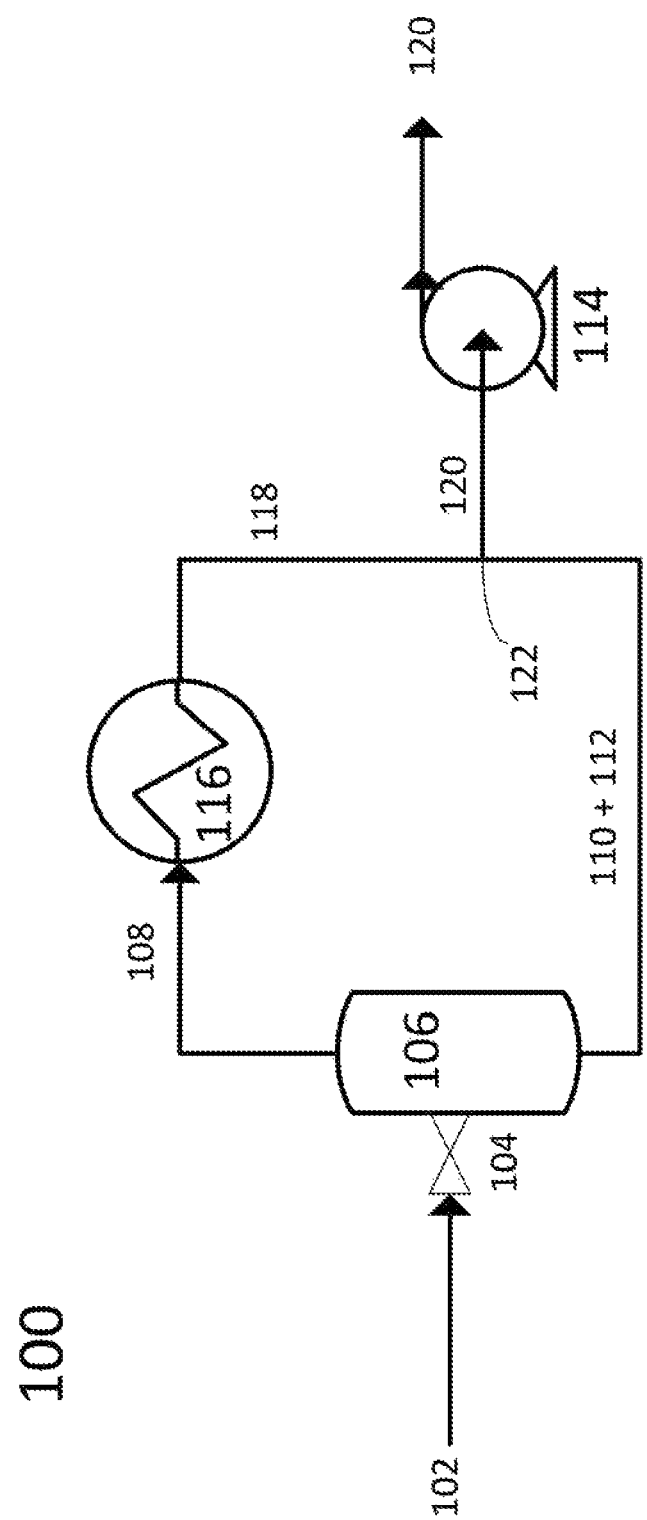
FIG. 1A is a process flow diagram showing one embodiment of the present invention.
Figure 1B:
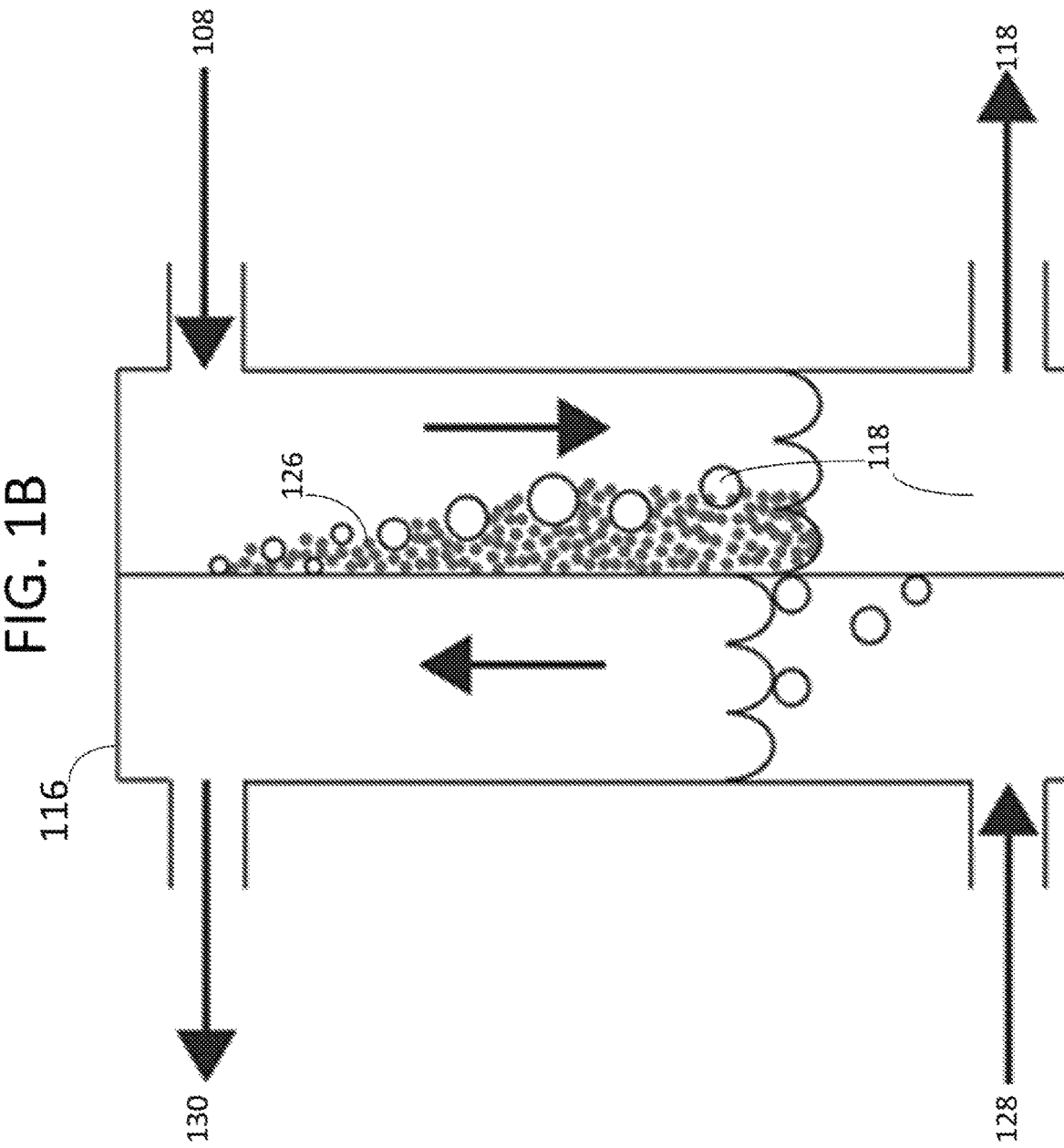
FIG. 1B is a cross-sectional view of a heat exchanger according to the present invention.

Referring to FIGS. 1A-B, process flow diagram 100 in FIG. 1A, and a cross-sectional view of heat exchanger 116 in FIG. 1B, show one embodiment of the present invention. First cryogenic liquid 102, which is saturated with a dissolved gas, is provided to expansion inlet valve 104 and expanded into separation vessel 106. The first cryogenic liquid separates into vapor 108, second cryogenic liquid 110, and first solid 112. First solid 112, which consists of frozen dissolved gas, is entrained in second cryogenic liquid 110, and is drawn from the bottom of separation vessel 106 by pump 114. Vapor 108, which consists of a portion of cryogenic liquid 102 and a portion of the dissolved gas, is drawn out of the top of separation vessel 106 into heat exchanger 116. A coolant 128 is provided to the heat exchanger 116. Vapor 108 is cooled against coolant 128 through heat exchanger 116, which causes coolant 128 to vaporize to spent coolant 130 and vapor 108 to condense into third cryogenic liquid 118 and second solid 126. In this instance, vapor 108 consists of two components. As such, vapor 108, third cryogenic liquid 118, and second solid 126 would possess a three-phase equilibrium. However, this equilibrium is continually upset by the cooling from heat exchanger 116. As such, vapor 108 would continue to condense into third cryogenic liquid 118 and second solid 126. Second solid 126 is more soluble in third cryogenic liquid 118 than in vapor 108, and therefore is removed and dissolved, leaving only third cryogenic liquid 118 to leave heat exchanger 116. Third cryogenic liquid 118 is drawn by pump 114 to tee 122 where it combines with second cryogenic liquid 110 and first solid 112 to form final cooled slurry 120. Final cooled slurry 120 is removed by pump 114, completing cryogenic cooling of first cryogenic liquid 102 without fouling of heat exchanger 116. In this embodiment, heat exchanger 116 is a single-pass plate heat exchanger oriented vertically. In other embodiments, heat exchanger 116 may be a shell and tube, plate and frame, plate and shell, spiral, or plate fin exchanger. In other embodiments, heat exchanger 116 may be a multi-pass exchanger. In other embodiments, carrier liquid inlet valve 104 may be an orifice plate or turbine. In some embodiments, a mixing chamber may be inserted before pump 104.

Referring to FIG. 2, one embodiment of the separation vessel of the present invention is shown. Separation vessel 202 has carrier liquid inlet valve 204 attached no higher than halfway up the side of separation vessel 202 to avoid feeding directly into packing material 206. Packing material 206 consists of a packing material in the top one third of the separation vessel. In other embodiments, packing material 206 may be a wire mesh. In other embodiments, carrier liquid inlet valve 204 may be an orifice plate or turbine.

Figure 3:
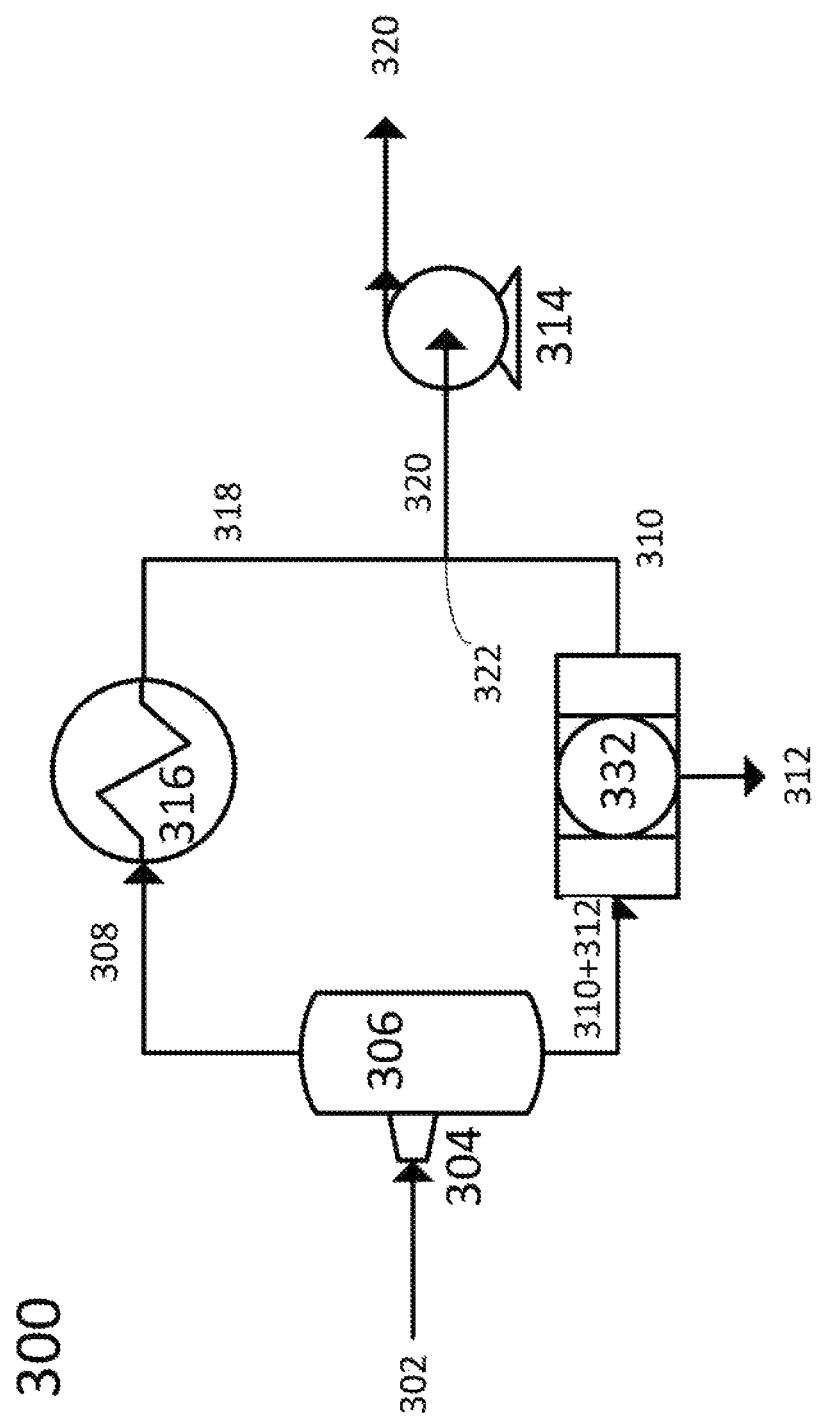
FIG. 3 is a process flow diagram showing one embodiment of the present invention.

Referring to FIG. 3, a process flow diagram 300 is shown, consistent with one embodiment of the present invention. First cryogenic liquid 302, which is saturated with a dissolved gas, is provided to expansion inlet turbine 304 and expanded into separation vessel 306. The first cryogenic liquid separates into vapor 308, second cryogenic liquid 310, and first solid 312. First solid 312, which consists of frozen dissolved gas, is entrained in second cryogenic liquid 310, and is drawn from the bottom of separation vessel 306 into solids removal process filter 332. Solids removal process filter 332 filters out first solid 312, allowing second cryogenic liquid 310 to be drawn out by pump 314. Vapor 308, which consists of a portion of cryogenic liquid 302 and a portion of the dissolved gas, is drawn out of the top of separation vessel 306 into heat exchanger 316. Vapor 308 is cooled against a coolant through heat exchanger 316, which causes the coolant to vaporize and vapor 308 to condense into third cryogenic liquid 318 and a second solid. In this instance, vapor 308 consists of two components. As such, vapor 308, third cryogenic liquid 118, and the second solid would possess a three-phase equilibrium. However, this equilibrium is continually upset by the cooling from heat exchanger 316. As such, vapor 308 would continue to condense into third cryogenic liquid 318 and the second solid. The second solid is more soluble in third cryogenic liquid 318 than in vapor 308, and therefore is removed and dissolved, leaving only third cryogenic liquid 318 to leave heat exchanger 316. Third cryogenic liquid 318 is drawn by pump 314 to tee 322 where it combines with second cryogenic liquid 310 to form final cooled liquid 320. Final cooled liquid 120 is removed by pump 314, completing cryogenic cooling of first cryogenic liquid 302 without fouling of heat exchanger 316. In this instance, the solid removal process is accomplished by a filter. In other embodiments, the solid removal process may be settling, centrifugation, electrostatic precipitation, agglomeration, froth floatation, crystallization, or combinations thereof. In some embodiments, heat exchanger 316 may be a shell and tube, plate, plate and frame, plate and shell, spiral, or plate fin exchanger. In other embodiments, carrier liquid inlet turbine 304 may be an orifice plate or valve.

Figure 4:
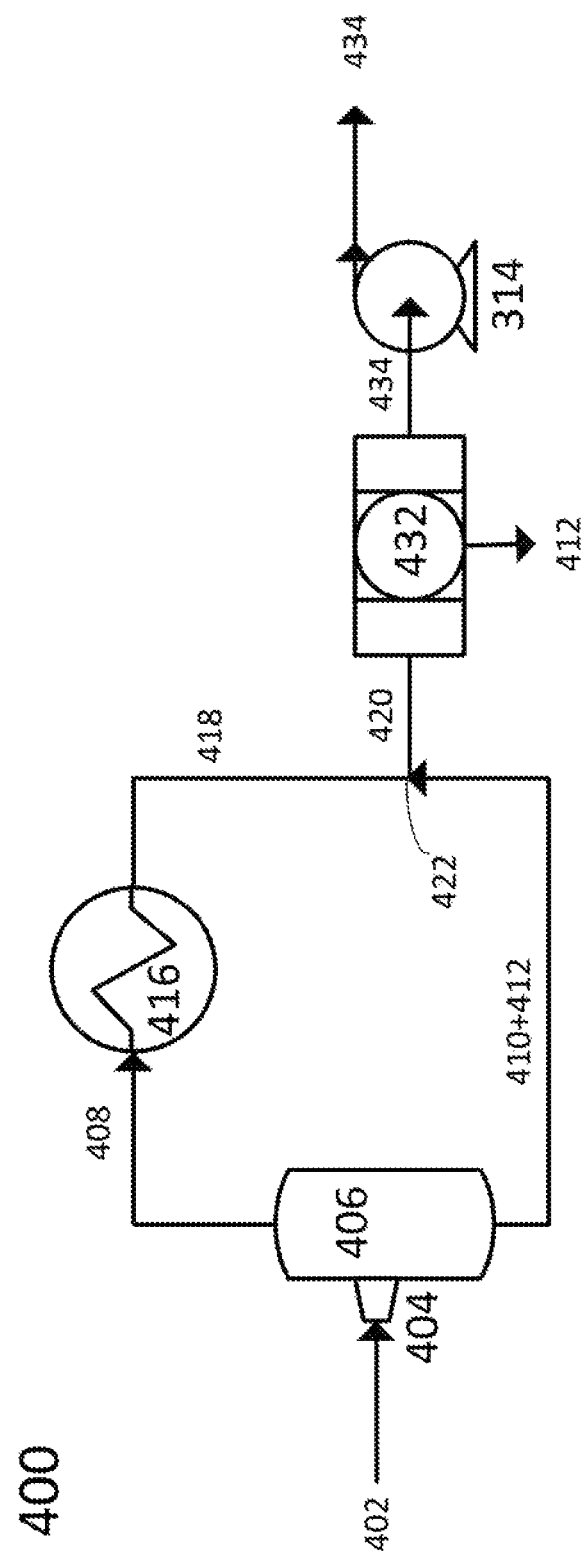
FIG. 4 is a process flow diagram showing one embodiment of the present invention.

Referring to FIG. 4, a process flow diagram 400 is shown, consistent with one embodiment of the present invention. First cryogenic liquid 402, which is saturated with a dissolved gas, is provided to expansion inlet turbine 404 and expanded into separation vessel 406. The first cryogenic liquid separates into vapor 408, second cryogenic liquid 410, and first solid 412. First solid 412, which consists of frozen dissolved gas, is entrained in second cryogenic liquid 410, and is drawn from the bottom of separation vessel 406 by pump 314. Vapor 408, which consists of a portion of cryogenic liquid 402 and a portion of the dissolved gas, is drawn out of the top of separation vessel 406 into heat exchanger 416. Vapor 408 is cooled against a coolant through heat exchanger 416, which causes the coolant to vaporize and vapor 408 to condense into third cryogenic liquid 418 and a second solid. In this instance, vapor 408 consists of two components. As such, vapor 408, third cryogenic liquid 418, and the second solid would possess a three-phase equilibrium. However, this equilibrium is continually upset by the cooling from heat exchanger 416. As such, vapor 408 would continue to condense into third cryogenic liquid 418 and the second solid. The second solid is more soluble in third cryogenic liquid 418 than in vapor 408, and therefore is removed and dissolved, leaving only third cryogenic liquid 418 to leave heat exchanger 416. Third cryogenic liquid 418 is drawn by pump 414 to tee 422 where it combines with second cryogenic liquid 410 to form final cooled slurry 420. Final cooled slurry 420 is drawn into solids removal process filter 432. Solids removal process filter 432 filters out first solid 412, allowing final cooled liquid 434 to be drawn out by pump 414, completing cryogenic cooling of first cryogenic liquid 402 without fouling of heat exchanger 416. In this instance, the solid removal process is accomplished by a filter. In other embodiments, the solids removal process may be settling, centrifugation, electrostatic precipitation, agglomeration, froth floatation, crystallization, or combinations thereof. In some embodiments, heat exchanger 416 may be a shell and tube, plate, plate and frame, plate and shell, spiral, or plate fin exchanger. In other embodiments, carrier liquid inlet turbine 304 may be an orifice plate or valve.

In some embodiments, the vapor may consist of more than two components. In some embodiments, the separation vessel and the expansion inlet are sized to cause the vapor produced to consist of between 20 and 99 mol % of the first cryogenic liquid. In some embodiments, the pump may be a centrifugal, piston, pressure-recovery, propeller, circulator, slurry, positive-displacement, diaphragm, progressive-cavity, screw, or vane pump. In some embodiments, any surface of the pump exposed to the final cooled slurry may be stainless steel, ceramics, cast aluminum, wrought aluminum, bronze, graphite resin, or combinations thereof.

In some embodiments, the dissolved gas consists of nitrogen oxide, sulfur dioxide, nitrogen dioxide, sulfur trioxide, hydrogen sulfide, hydrogen cyanide, water, hydrocarbons with a freezing point above 0 C, or combinations thereof.

In some embodiments, any surface of the separation vessel exposed to the first cryogenic liquid, the second cryogenic liquid, or the third cryogenic liquid comprises aluminum, stainless steel, polymers, ceramics, polytetrafluoroethylene, polychlorotrifluoroethylene, natural diamond, man-made diamond, chemical-vapor deposition diamond, polycrystalline diamond, or combinations thereof.

In some embodiments, any surface of the heat exchanger exposed to the vapor comprises aluminum, stainless steel, polymers, ceramics, polytetrafluoroethylene, polychlorotrifluoroethylene, natural diamond, man-made diamond, chemical-vapor deposition diamond, polycrystalline diamond, or combinations thereof. In some embodiments, any surface of the heat exchanger exposed to the vapor is polished smooth.

In some embodiments, the coolant comprises liquid nitrogen, ethane, methane, propane, refrigerants, and combinations thereof.

In some embodiments, the second cryogenic liquid and the first solid are combined through a mixing chamber before the pump with the third cryogenic liquid.

The invention claimed is:

1. A method for cryogenic cooling without fouling, the method comprising:
   providing a first cryogenic liquid, wherein the first cryogenic liquid is saturated with a dissolved gas;
   expanding the first cryogenic liquid into a separation vessel through an expansion inlet, wherein:
     the first cryogenic liquid separates into a vapor, a second cryogenic liquid, and a first solid;
     the first solid consists of a frozen form of the dissolved gas;
     the first solid is entrained in the second cryogenic liquid;
     the vapor is saturated with at least a portion of the dissolved gas;
   using a pump to draw the vapor into a heat exchanger and to draw the second cryogenic liquid and the first solid out of the separation vessel;
   providing a coolant to the heat exchanger;
   cooling the vapor against the coolant through the heat exchanger, causing the vapor to form a third cryogenic liquid and a second solid; wherein the second solid has a greater solubility in the third cryogenic liquid than in the vapor, wherein the third cryogenic liquid removes and dissolves any of the second solid that forms on the heat exchanger as the vapor condenses;
   combining the second cryogenic liquid and the first solid with the third cryogenic liquid, producing a final cooled slurry; and,
   whereby the cryogenic cooling is accomplished without fouling.

2. The method of claim 1, wherein the heat exchanger is a single-pass heat exchanger oriented vertically with the vapor entering at a top inlet and the third cryogenic liquid washing down any of the second carbon dioxide solid that forms on the heat exchanger.

3. The method of claim 1, wherein the first cryogenic liquid comprises any compound or mixture of compounds with a freezing point below a temperature at which the first solid forms.

4. The method of claim 1, wherein the dissolved gas consists of nitrogen oxide, sulfur dioxide, nitrogen dioxide, sulfur trioxide, hydrogen sulfide, hydrogen cyanide, water, hydrocarbons with a freezing point above 0° C., or combinations thereof.

5. The method of claim 1, wherein the separation vessel contains a demister in the top one third of the separation vessel and the first cryogenic liquid enters the separation vessel no higher than halfway up the separation vessel.

6. The method of claim 5, wherein the demister comprises wire mesh or packing material.

7. The method of claim 1, wherein the expansion inlet comprises a valve, turbine, or orifice plate.

8. The method of claim 1, wherein the heat exchanger comprises a shell and tube, plate, plate and frame, plate and shell, spiral, or plate fin exchanger.

9. The method of claim 1, wherein any surface of the separation vessel exposed to the first cryogenic liquid, the second cryogenic liquid, or the third cryogenic liquid comprises aluminum, stainless steel, polymers, ceramics, polytetrafluoroethylene, polychlorotrifluoroethylene, natural diamond, man-made diamond, chemical-vapor deposition diamond, polycrystalline diamond, or combinations thereof.

10. The method of claim 1, wherein any surface of the heat exchanger exposed to the vapor comprises aluminum, stainless steel, polymers, ceramics, polytetrafluoroethylene, polychlorotrifluoroethylene, natural diamond, man-made diamond, chemical-vapor deposition diamond, polycrystalline diamond, or combinations thereof.

11. The method of claim 10, wherein the any surface of the heat exchanger exposed to the vapor is polished smooth.

12. The method of claim 1, wherein the separation vessel and the expansion inlet are sized to cause the vapor produced to consist of between 20 and 99 mol % of the first cryogenic liquid.

13. The method of claim 1, wherein the pump comprises a centrifugal, piston, pressure-recovery, propeller, circulator, slurry, positive-displacement, diaphragm, progressive-cavity, screw, or vane pump.

14. The method of claim 13, wherein any surface of the pump exposed to the final cooled slurry comprises stainless steel, ceramics, cast aluminum, wrought aluminum, bronze, graphite resin, or combinations thereof.

15. The method of claim 1, wherein the coolant comprises liquid nitrogen, ethane, methane, propane, refrigerants, and combinations thereof.

16. The method of claim 1, wherein the second cryogenic liquid and the first solid are combined through a mixing chamber before the pump with the third cryogenic liquid.

17. The method of claim 16, wherein a solids removal process is placed after the mixing chamber.

18. The method of claim 17, wherein the solids removal process comprises filtration, settling, centrifugation, electrostatic precipitation, agglomeration, froth floatation, crystallization, or combinations thereof.

19. The method of claim 1, wherein the second cryogenic liquid and the first solid are passed through a solids removal process before the pump, whereby the first solid is removed.

20. The method of claim 19, wherein the solids removal process comprises filtration, settling, centrifugation, electrostatic precipitation, agglomeration, froth floatation, crystallization, or combinations thereof.

* * * * *